United States Patent
Raman et al.

(10) Patent No.: US 9,940,160 B1
(45) Date of Patent: Apr. 10, 2018

(54) MANAGED REBOOT OF A NETWORK OPERATING SYSTEM

(71) Applicant: Juniper Networks, Inc., Sunnyvale, CA (US)

(72) Inventors: Ganesh Raman, San Jose, CA (US); Chirag Wighe, Milpitas, CA (US); Santhanakrishnan Balraj, Dublin, CA (US); Sathish M. Shenoy, San Jose, CA (US); Shunmugavel Rajarathinam, Alviso, CA (US); Sumanth R. Kamatala, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 4 days.

(21) Appl. No.: 15/276,220

(22) Filed: Sep. 26, 2016

Related U.S. Application Data

(63) Continuation-in-part of application No. 14/940,302, filed on Nov. 13, 2015.

(51) Int. Cl.
*G06F 9/455* (2006.01)

(52) U.S. Cl.
CPC .......... *G06F 9/45558* (2013.01); *G06F 2009/45562* (2013.01); *G06F 2009/45575* (2013.01)

(58) Field of Classification Search
None
See application file for complete search history.

(56) References Cited

U.S. PATENT DOCUMENTS

| | | | |
|---|---|---|---|
| 6,698,017 B1 | 2/2004 | Adamovits et al. | |
| 8,799,422 B1 * | 8/2014 | Qu | G06F 8/67 709/220 |
| 2011/0032830 A1 * | 2/2011 | Merwe | H04L 45/586 370/251 |
| 2012/0102135 A1 | 4/2012 | Srinivasan et al. | |
| 2014/0040887 A1 * | 2/2014 | Morariu | G06F 9/44505 718/1 |
| 2014/0269254 A1 * | 9/2014 | Choorakkot Edakkunni | H04L 41/082 370/218 |
| 2016/0328251 A1 * | 11/2016 | Bernstein | G06F 9/455 |

OTHER PUBLICATIONS

Cisco, "Cisco Nexus 3000 Series NX-OS Software Upgrade and Downgrade Guide, Release 6.x", http://www.cisco.com/c/en/us/td/docs/switches/datacenter/nexus3000/sw/upgrade/6_x/Cisco_n3k_Upgrade_Downgrade_6x.html#pgfld714131, Sep. 15, 2015, 30 pages.

Co-pending U.S. Appl. No. 14/940,302, filed Nov. 13, 2015 entitled "Managed Reboot of a Multi-Service Network Device", Madasamy et al., 39 pages.

\* cited by examiner

*Primary Examiner* — Wynuel Aquino
(74) *Attorney, Agent, or Firm* — Harrity & Harrity, LLP

(57) ABSTRACT

A device may receive an indication to perform a reboot associated with a network service being provided using a first virtual machine (VM) running on the device. The device may launch, based on receiving the indication, a second VM on the device. The device may shut down, based on launching the second VM, the first VM. The device may configure the second VM for forwarding control plane traffic associated with the network service. The device may configure, based on configuring the second VM for forwarding the control plane traffic, the second VM for forwarding data plane traffic associated with the network service. The device may provide, based on configuring the second VM for (Continued)

forwarding the data plane traffic, the network service using the second VM.

20 Claims, 7 Drawing Sheets

MANAGED REBOOT OF A NETWORK OPERATING SYSTEM

RELATED APPLICATION

This application is a Continuation-In-Part (CIP) of U.S. patent application Ser. No. 14/940,302, filed on Nov. 13, 2015, the content of which is incorporated by reference herein in its entirety.

BACKGROUND

Operating-system-level virtualization allows a physical device to be virtualized at a host operating system level, thereby enabling multiple, isolated "guest" operating systems (e.g., each running as a virtual machine (VM)) to run concurrently, and share the same instance of the host operating system running on the physical device.

SUMMARY

According to some possible implementations, a method may include receiving, by a device, an indication to perform a reboot associated with a network service being provided using a first virtual machine (VM) running on the device; launching, by the device and based on receiving the indication, a second VM on the device; shutting down, by the device and based on launching the second VM, the first VM; configuring, by the device, the second VM for forwarding control plane traffic associated with the network service; configuring, by the device and based on configuring the second VM for forwarding the control plane traffic, the second VM for forwarding data plane traffic associated with the network service; and providing, by the device and based on configuring the second VM for forwarding the data plane traffic, the network service using the second VM.

According to some possible implementations, a system may include a network device to: receive an indication to perform a reboot associated with a network service, where the network service may be provided by a first virtual machine (VM) running on the network device; launch, based on receiving the indication, a second VM on the network device; shut down the first VM after launching the second VM, where the shutting down the first VM may cause control plane traffic, associated with the network service, to stop being forwarded by the network device; configure the second VM for forwarding the control plane traffic associated with the network service; initiate configuration of the second VM for forwarding data plane traffic associated with the network service, where the initiating the configuration of the second VM for forwarding the data plane traffic may cause the data plane traffic to stop being forwarded by the network device; and provide, after configuration of the second VM for forwarding the data plane traffic is complete, the network service using the second VM, where the providing the network service using the second VM may cause the control plane traffic and the data plane traffic to resume being forwarded by the network device.

According to some possible implementations, a non-transitory computer-readable medium may store instructions that, when executed by a network device, cause the network device to: receive an indication to perform a reboot associated with a network service being provided using a first virtual machine (VM) running on the network device; launch, based on receiving the indication, a second VM on the network device; shut down, based on launching the second VM, the first VM; configure the second VM for forwarding first traffic associated with the network service; configure, after configuring the second VM for forwarding the first traffic, the second VM for forwarding second traffic associated with the network service; and provide, based on configuring the second VM for forwarding the second traffic, the network service using the second VM.

DETAILED DESCRIPTION

The following detailed description of example implementations refers to the accompanying drawings. The same reference numbers in different drawings may identify the same or similar elements.

A network device, such as a top-of-rack (TOR) switch or an end-of-rack (EOR) switch, may host a network operating system (OS) associated with providing a network service (e.g., a packet forwarding service, a security service, a firewall service, etc.). In some implementations, the network OS may run as a virtual machine (VM) configured on a host OS of the network device. For example, the host OS of the network device may host a VM that acts as the network OS (e.g., such that the VM forwards control plane traffic and data plane traffic associated with the network service).

However, the network OS may need to be rebooted at a particular time, such as based on a request from a user, due to a hardware failure, due to a software failure, or the like. As such, the network service may not be available for the duration of the reboot (e.g., from shutdown to complete restart of the VM hosting the network OS), which may negatively impact a performance of the network device and/or a network associated with the network device.

Implementations described herein may provide a managed reboot, associated with a network OS running as a VM, that increases availability of a network service provided by the network OS (e.g., as compared to a traditional reboot). In other words, the managed reboot may reduce an amount of time during which the network service is unavailable due to the reboot of the network OS. In some implementations, the managed reboot may be performed based on creating a secondary VM to run as the network OS (in addition to a primary VM that runs as the network OS).

Figure 1A:
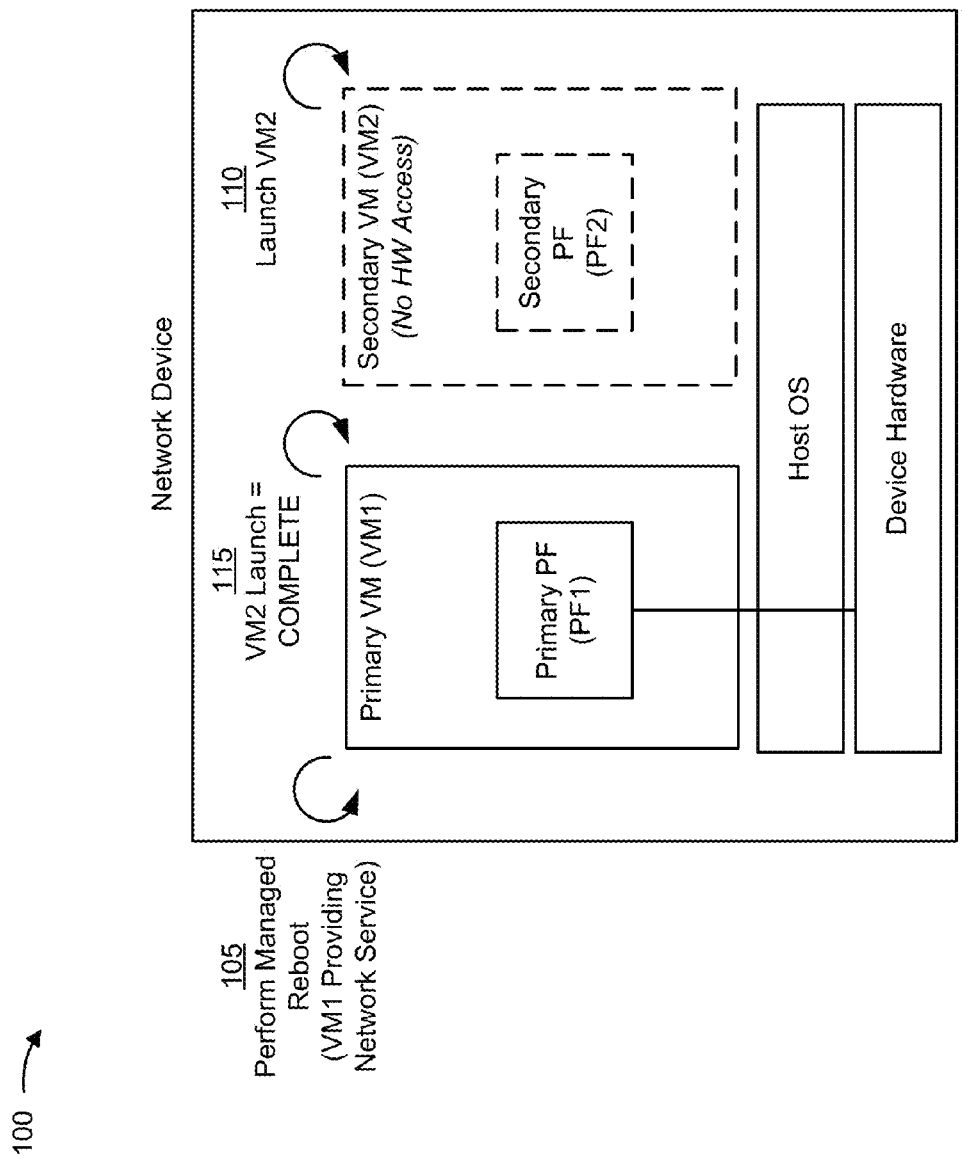
FIGS. 1A-1C are diagrams of an overview of an example implementation described herein.
Figure 1B:
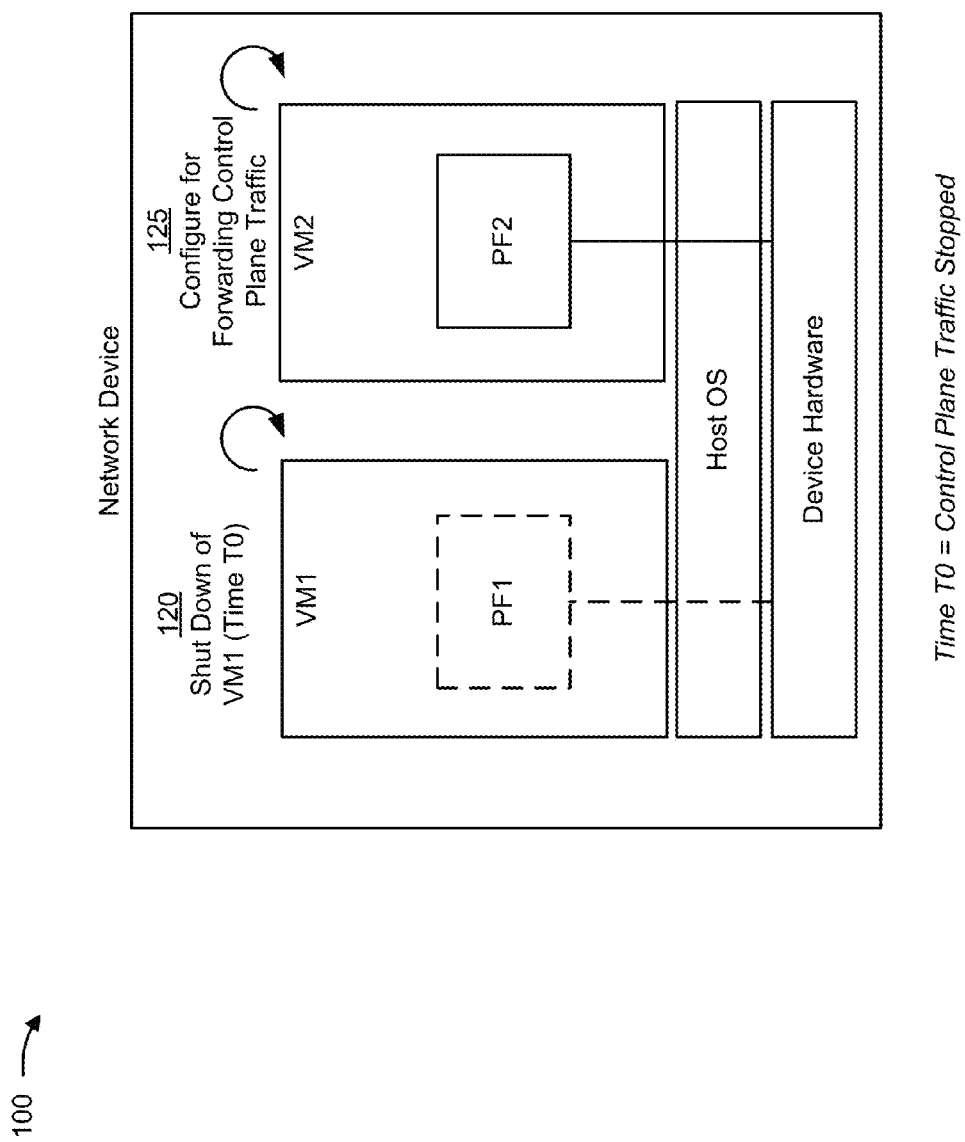
Figure 1C:
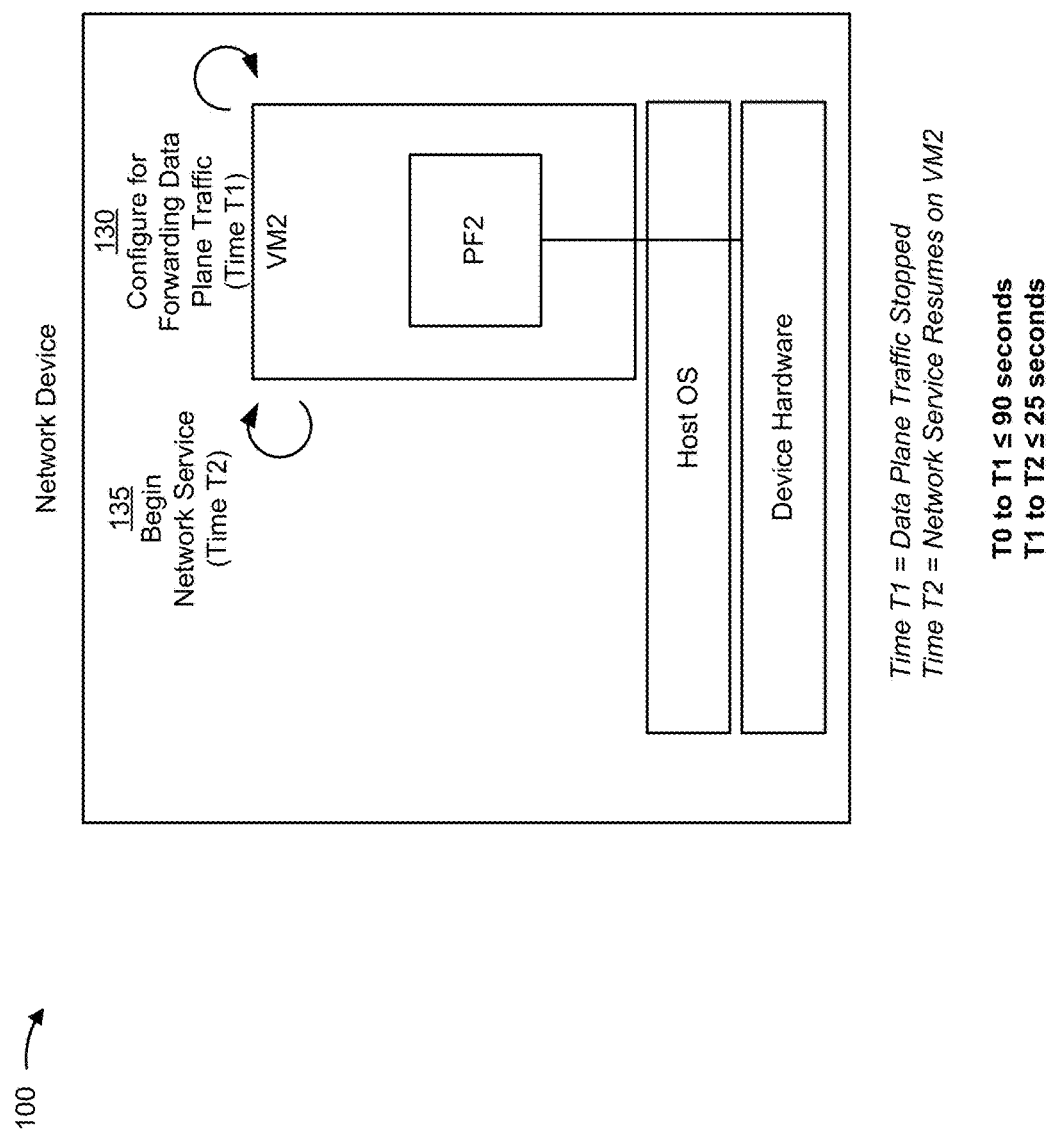

FIGS. 1A-1C are diagrams of an overview of an example implementation 100 described herein. For the purposes of example implementation 100, assume that a host OS of a network device supports a primary VM that is running a primary packet forwarding daemon (PF). Here, the VM acts as a network OS associated with a network service provided by the network device, and the primary PF acts as an element of the network OS that is to manage and/or configure forwarding of packets associated with the network service provided by the network OS. In some implementations, primary VM may include one or more other elements that, for purposes of clarity, are not shown in example implementation 100.

As shown in FIG. 1A, and by reference number 105, the primary VM may receive an indication to perform a managed reboot of the network OS. For example, the primary VM may receive the indication based on detecting a failure associated with the network service (e.g., a hardware failure, a software failure, etc.), user input indicating that the network device is to perform a managed reboot of the network OS, an expiration of a timer related to a scheduled managed reboot of the network OS, or the like.

In some implementations, the primary VM may enable a managed reboot mode on the network device based on receiving the indication. The managed reboot mode may include a mode that, while enabled on the network device, causes an element of the network device to alter one or more operations, associated with operating the network OS, that are to be performed by the element. For example, when the managed boot mode is enabled, the secondary VM and/or the primary VM may skip and/or alter an operation associated with launching the network OS and/or shutting down, respectively, as described below.

As shown by reference number 110, the primary VM may cause, based on receiving the indication, the secondary VM to be launched on the host OS of the network device. As described below, use of the secondary VM may reduce an amount of time during reboot that the network service is unavailable. In some implementations, the secondary VM may determine that the managed reboot mode is enabled on the network device and, as shown, may prevent the secondary VM and/or the secondary PF from accessing and/or initializing hardware of the network device. Here, the managed reboot mode being enabled allows the network device to launch the secondary VM without interfering with the network service provided by the network OS of the primary VM. As shown by reference number 115, the primary VM may determine (e.g., based on information provided by the secondary VM and/or the host OS) that the launch of the secondary VM is complete.

As shown in FIG. 1B, and by reference number 120, the primary VM may shut down after the primary VM determines that the launch of the secondary VM is complete. At this point, control plane traffic may not be forwarded to the primary VM (e.g., since the control plane traffic was being forwarded to the primary VM). However, data plane traffic may still be forwarded by the network device. For example, the primary VM may determine that the network device is in the managed reboot mode, and may skip an operation associated with shutting down ports of the network device in order to permit the network device to continue forwarding data plane traffic (e.g., based on existing configurations of the network device). A time at which the network device shuts down the primary VM may be referred to herein as a control plane traffic stop time. In some implementations, the primary VM may disable the managed reboot mode on the network device as a part of shutting down. This allows the secondary VM to be configured for forwarding traffic, as described below.

As shown by reference number 125, the secondary VM may be configured for forwarding of control plane traffic based on the shutdown of primary VM. For example, the secondary VM may determine that the managed reboot mode has been disabled on the network device, and may be configured for forwarding of the control plane traffic. In some implementations, the secondary VM may be configured for forwarding of the control plane traffic by performing one or more operations associated with configuring elements of the secondary VM to provide the network service associated with the network OS. In other words, the secondary VM may configure one or more (software) elements of the secondary VM for forwarding of the control plane traffic.

In some implementations, the secondary VM may complete the operations, associated with being configured for forwarding of the control plane traffic, before the secondary VM starts an operation associated with being configured for forwarding of data plane traffic, in order to reduce an amount of time that the data plane is unavailable for forwarding of data plane traffic. For example, the network device may stop forwarding data plane traffic when the secondary VM starts the operation associated with being configured for forwarding of the data plane traffic. As such, the secondary VM may wait to perform data plane related operations in order to allow the network device to continue forwarding data plane traffic while the secondary VM is configured for forwarding the control plane traffic.

As shown in FIG. 1C, and by reference number 130, the secondary VM may be configured for forwarding of data plane traffic after the secondary VM is configured for forwarding of the control plane traffic. For example, the secondary VM may perform operations associated with initializing hardware (e.g., an application specific integrated circuit (ASIC)) of the network device. In some implementations, when the secondary VM begins the hardware initialization, the network device may stop forwarding data plane traffic. A time at which the network device stops forwarding the data plane traffic may be referred to herein as a data plane traffic stop time.

As shown by reference number 135, the secondary VM may begin providing the network service after the secondary VM is configured for forwarding of the data plane traffic (e.g., after initialization of the hardware is complete). In other words, an instance of the network OS is fully configured and running on the secondary VM, and may begin providing the network service. A time at which the secondary VM is ready to provide the network service may be referred to herein as a network service restart time.

In some implementations, an amount of time between the control plane traffic stop time and the network service restart time (e.g., an amount time that control plane traffic is not forwarded) may be less than a corresponding amount of time associated with a traditional reboot (e.g., a reboot that includes shutting down and restarting the primary VM for provisioning of the network service). For example, as indicated in FIG. 1C, the amount of time between the control plane traffic stop time and the network service restart time may be less than or equal to approximately ninety seconds.

Additionally, or alternatively, an amount of time between the data plane traffic stop time and the network service restart time (e.g., an amount of time that data plane traffic is not forwarded) may be less than a corresponding amount of time associated with the traditional reboot. For example, as indicated in FIG. 1C, the amount of time between the data plane traffic stop time and the network service restart time may be less than or equal to approximately twenty-five seconds.

In this way, a network device may perform a managed reboot of a network OS associated with providing a network service provided by the network device. The managed reboot may increase availability of the network service (e.g., as compared to a traditional reboot). In other words, the managed reboot may reduce an amount of time during which the network service is unavailable.

As indicated above, FIGS. 1A-1C are provided merely as an example. Other examples are possible and may differ from what was described with regard to FIGS. 1A-1C.

Figure 2:
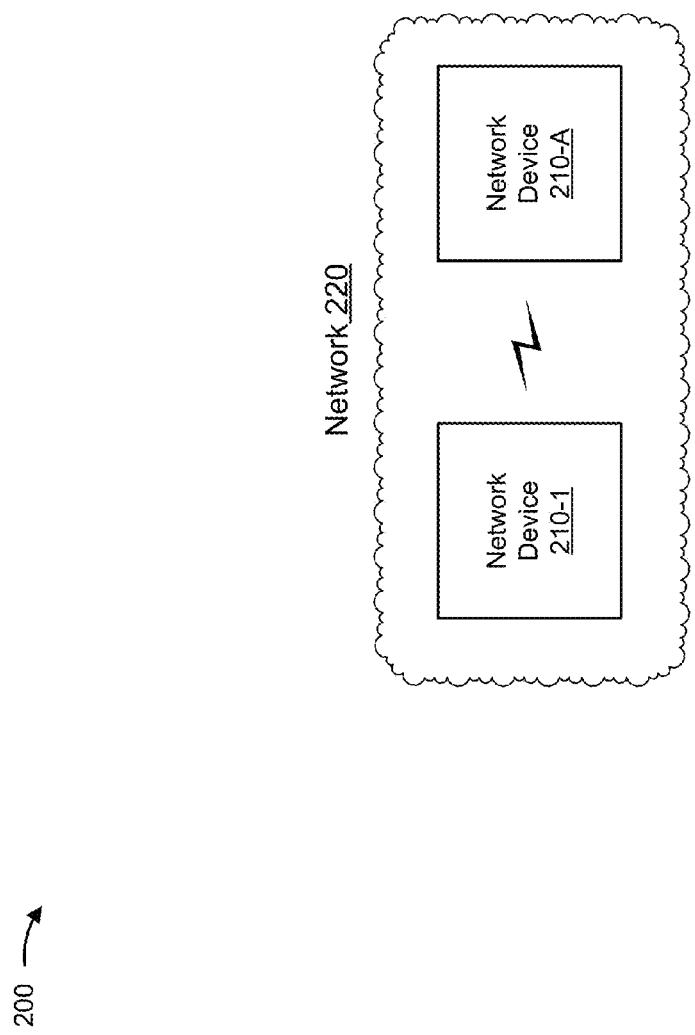
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-A (A≥1) (hereinafter referred to collectively as network devices 210, and individually as network device 210), and a network 220. Devices of environment 200 may interconnect via wired connections, wireless connections, or a combination of wired and wireless connections.

Network device 210 includes a device (e.g., a traffic transfer device) capable of providing a network service and/or transferring traffic between network devices 210 and/or other devices associated with network 220. For example, network device 210 may include a switch (e.g., a TOR switch, and EOR switch, etc.), a router, a gateway, a hub, a bridge, a firewall, a reverse proxy, a server (e.g., a proxy server), a cloud resource, a security device, an intrusion detection device, or a similar device. In some implementations, network device 210 may be a standalone device, a device that is not chassis-based, or the like.

In some implementations, network device 210 may run a host OS that is capable of creating, managing, and/or operating one or more VMs in order to host a network OS associated with providing the network service. In some implementations, network device 210 may be capable of providing one or more network services associated with one or more network OSes. Additional details regarding network device 210 are provided below.

Network 220 includes one or more wired and/or wireless networks that include network devices 210 and/or allow network devices 210 to communicate. For example, network 220 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a private network, a cloud computing network, and/or a combination of these or other types of networks. In some implementations, network devices 210 may be network devices of a data center and network 220 may be a communications network for the data center.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
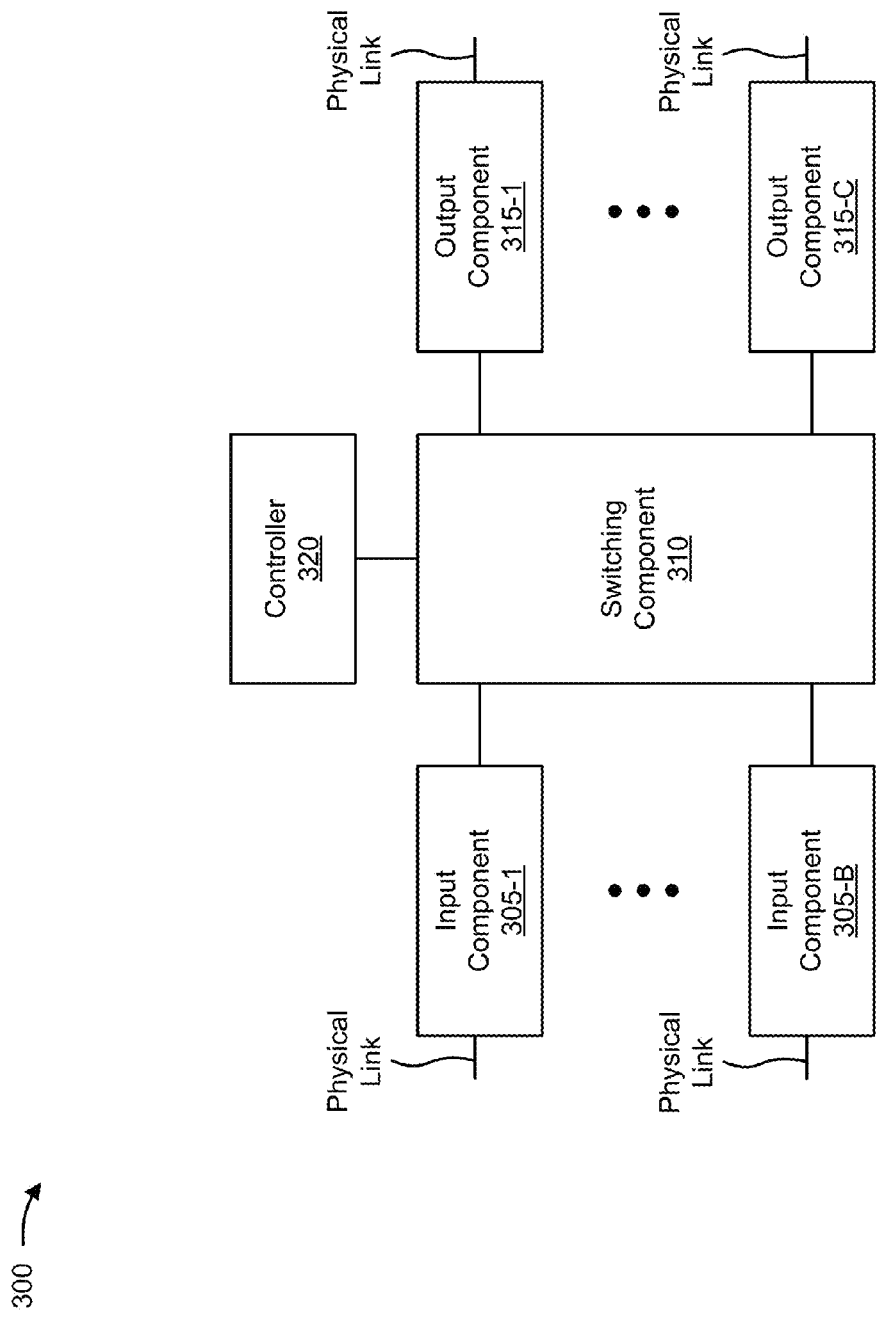
FIG. 3 is a diagram of example components of a network device of FIG. 2.

FIG. 3 is a diagram of example components of a device 300. Device 300 may correspond to network device 210. In some implementations, network device 210 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 includes a point of attachment for a physical link connected to device 300, and may be a point of entry for incoming traffic (e.g., packets) received by device 300. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues.

Switching component 310 interconnects input components 305 and output components 315. In some implementations, switching component 310 may be implemented via one or more crossbars, via one or more busses, and/or using shared memory. The shared memory may act as a temporary buffer to store packets from input components 305 before the packets are eventually scheduled for delivery to output components 315. In some implementations, switching component 310 may enable input components 305, output components 315, and/or controller 320 to communicate.

Output component 315 includes a point of attachment for a physical link connected to device 300, and may be a point of exit for outgoing traffic (e.g., packets) transmitted by device 300. Output component 315 may store packets and/or may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, input component 305 and output component 315 may be implemented by the same set of components (e.g., an input/output component may be a combination of input component 305 and output component 315).

Controller 320 includes a processor in the form of, for example, a central processing unit (CPU), a microprocessor, a microcontroller, a field-programmable gate array (FPGA), an application-specific integrated circuit (ASIC), and/or another type of processor that can interpret and/or execute instructions. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, may create forwarding tables based on the routing tables, and may forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 320 from another computer-readable medium or from another device via a communication interface. When executed, software instructions stored in a memory and/or a storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
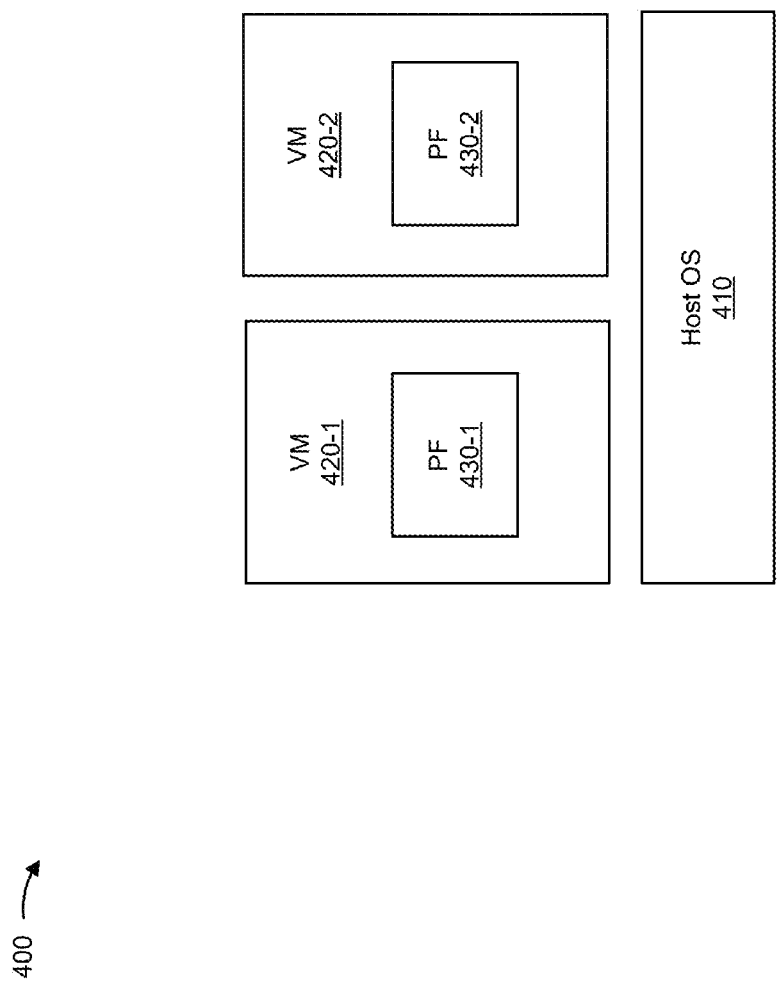
FIG. 4 is a diagram of example functional elements of a network device shown in FIG. 2.

FIG. 4 is a diagram of example functional elements of network device 210 of FIG. 2. As shown in FIG. 4, network device 210 may include a host OS 410, a primary VM 420 (e.g., VM 420-1) including a primary PF 430 (e.g., PF 430-1), and a secondary VM 420 (e.g., VM 420-2) including a secondary PF 430 (e.g., PF 430-2).

In some implementations, host OS 410, primary VM 420, secondary VM 420, primary PF 430, and secondary PF 430 may be implemented using a processor of network device 210. In some implementations, host OS 410, primary VM 420, secondary VM 420, primary PF 430, and secondary PF 430 may be implemented using controller 320. In some implementations, at least one of host OS 410, primary VM 420, secondary VM 420, primary PF 430, and/or secondary PF 430 may be implemented using controller 320, and/or at least one of host OS 410, primary VM 420, secondary VM 420, primary PF 430, and/or secondary PF 430 may be implemented in input component 305, switching component 310, and/or output component 315.

Host OS 410 includes an OS associated with network device 210. For example, host OS 410 may include a Linux OS or another type of OS that provides virtualization capability. In some implementations, host OS 410 may support VMs 420 capable of hosting a network OS associated with providing a network service. Additionally, or alternatively, host OS 410 may be capable of creating, operating, managing, or the like, the supported VMs 420.

VM 420 (e.g., primary VM 420, secondary VM 420) includes a virtual device capable of performing functions associated with hosting a network OS that provides a network service. For example, VM 420 may include a VM configured to host a network OS that acts as a control plane and a data plane associated with the network service. In some implementations, VM 420 may be created, supported, operated, managed, or the like, by host OS 410. In some implementations, VM 420 may communicate with one or more other functional elements of network device 210 (e.g., host OS 410, another VM 420, PF 430) and/or may configure or utilize one or more hardware components of network device 210 (e.g., an ASIC, a FPGA, etc.) in association with hosting the network OS and/or providing the network service. In some implementations, multiple VMs 420 may operate concurrently on host OS 410. For example, primary VM 420 and secondary VM 420 may operate concurrently on host OS 410 in order to allow a managed reboot to be performed, as described elsewhere herein.

In some implementations, VM 420 may include PF 430 associated with providing the network service using the network OS. Additional details regarding PF 430 are described below. Additionally, while not shown in FIG. 4, VM 420 may host one or more other functional elements associated with operating the network OS and/or providing the network service, such as a management daemon, a routing protocol daemon, a device control daemon, a chassis daemon, or the like.

PF 430 (e.g., primary PF 430, secondary PF 430) includes one or more functional elements, such as a daemon, capable of orchestrating and/or managing the forwarding of traffic associated with the network service provided the network OS. In some implementations, PF 430 may operate on VM 420. In some implementations, PF 430 may communicate with one or more other functional elements of network device 210 (e.g., host OS 410, VM 420, etc.) and/or may configure or utilize one or more hardware components of network device 210 (e.g., an ASIC, a FPGA, etc.) in association with hosting the network OS and/or providing the network service. In some implementations, multiple PFs 430 may operate concurrently. For example, primary PF 430 may operate on primary VM 420 while secondary PF 430 operates on secondary VM 420 in order to allow a managed reboot to be performed, as described elsewhere herein.

The number and arrangement of functional elements shown in FIG. 4 are provided as an example. In practice, network device 210 may include additional functional elements, fewer functional elements, different functional elements, or differently arranged functional elements than those shown in FIG. 4. Additionally, or alternatively, a set of functional elements (e.g., one or more functional elements) of network device 210 may perform one or more functions described as being performed by another set of functional elements of network device 210.

Figure 5:
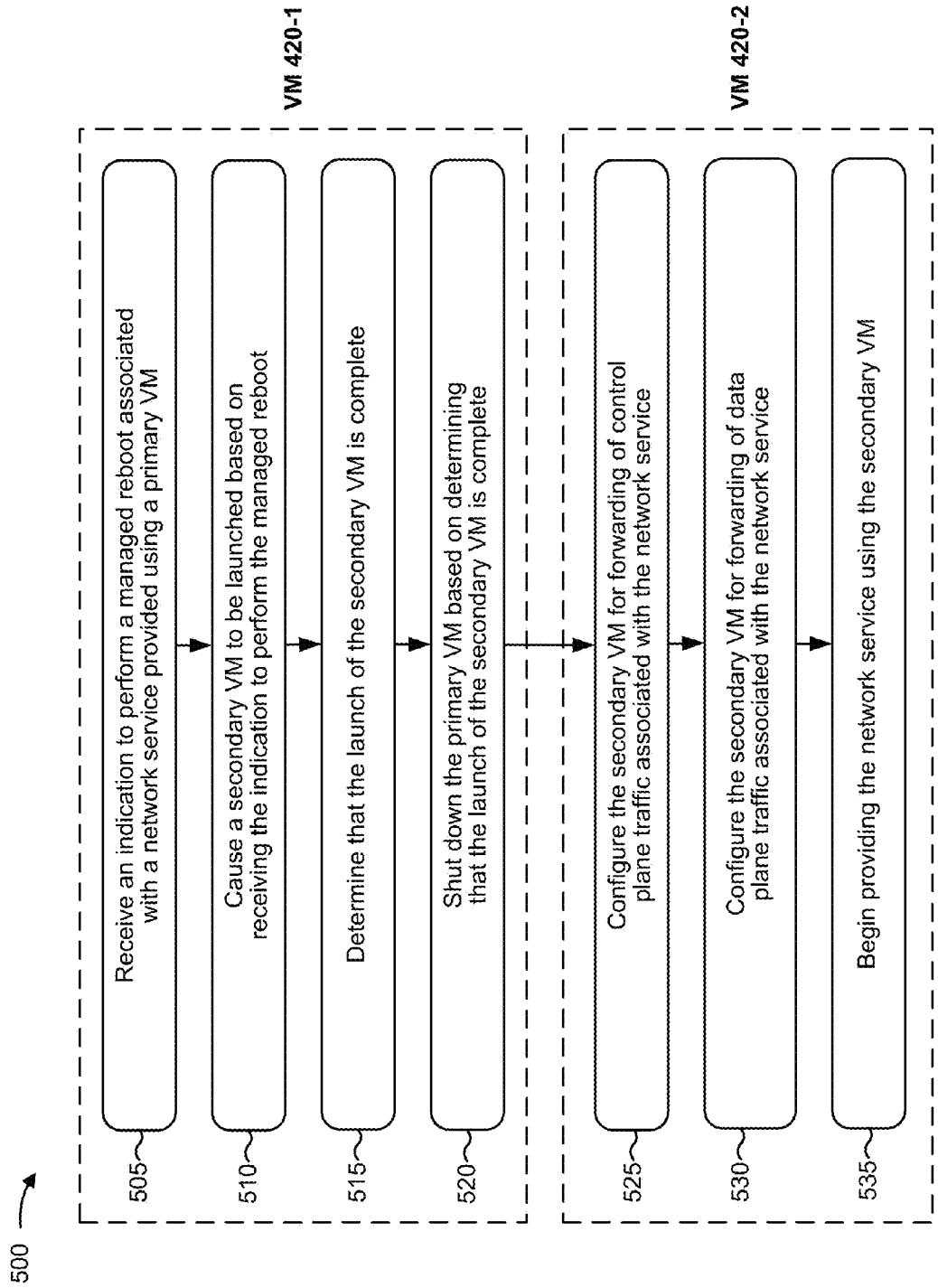
FIG. 5 is a flow chart of an example process for performing a managed reboot of a network operating system associated with providing a network service.

FIG. 5 is a flow chart of an example process 500 for performing a managed reboot of a network OS associated with providing a network service. In some implementations, one or more process blocks of FIG. 5 may be performed by elements of network device 210, such as primary VM 420 and secondary VM 420 (as indicated in FIG. 5). In some implementations, one or more process blocks of FIG. 5 may be performed by another element or a group of elements of network device 210, another network device 210, and/or one or more elements of the other network device 210. Notably, while example process 500 may be described in the context of a packet forwarding service as the network service provided by network device 210, example process 500 may apply to another type of network service that may be provided by network device 210, such as a security service, a firewall service, or the like.

As shown in FIG. 5, process 500 may include receiving an indication to perform a managed reboot associated with a network service provided using a primary VM (block 505). For example, primary VM 420 (e.g., VM 420-1) may receive an indication to perform a managed reboot associated with a network service provided using primary VM 420. The managed reboot may include a reboot of a network OS that uses multiple VMs 420 while increasing availability of the network service as compared to a traditional reboot (i.e., by reducing an amount of time during which the network service is unavailable).

In some implementations, primary VM 420 may receive the indication based on a failure detected by primary VM 420. For example, primary VM 420 may detect a hardware failure associated with the network OS, the network service, and/or network device 210, and/or a software failure associated with the network OS, the network service, and/or network device 210. Here, the detection of the hardware failure and/or the software failure may act as the indication to perform the managed reboot. In some implementations, primary VM 420 may be configured (e.g., as a default, based on user input, etc.) to perform the managed reboot based on detecting the hardware failure and/or the software failure (e.g., rather than a traditional reboot).

Additionally, or alternatively, primary VM 420 may receive the indication based on user input. For example, primary VM 420 may receive user input indicating that network device 210 is to perform a reboot of the network OS associated with providing the network service. In some implementations, primary VM 420 may be configured (e.g., as a default, based on user input, etc.) to perform the managed reboot based on receiving the user input (e.g., rather than a traditional reboot).

Additionally, or alternatively, primary VM 420 may receive the indication based on a configuration of primary VM 420. For example, primary VM 420 may be configured to periodically (e.g., at 12:00 a.m. on a particular day of the week, once every 24 hours, etc.) perform the managed reboot.

In some implementations, upon receiving the indication, primary VM 420 may enable a managed reboot mode on network device 210. For example, upon receiving the indication, primary VM 420 may enable the managed reboot mode on network device 210 by setting a reboot mode variable, stored in a kernel associated with the host OS, to a value indicating that the managed reboot mode is enabled (e.g., such that the value may be read by one or more elements of network device 210 at a later time).

The managed reboot mode may include a mode that, while enabled on network device 210, causes an element of network device 210 to alter one or more operations, associated with operating the network OS, that are to be performed by the element. For example, when the managed reboot mode is enabled on network device 210, secondary VM 420, upon launching, may prevent elements of VM 420 from communicating with another element of network device 210, as described in further detail below. As another example, when the managed reboot mode is enabled on network device 210, secondary PF 430, upon starting, may delay initialization or reset of a component of network device 210, as described in further detail below. As yet another example, when the managed reboot mode is enabled on network device 210, primary PF 430, upon shutdown of primary VM 420, may skip or delay a step associated with shutting down primary VM 420, as described in further detail below.

In some implementations, by enabling the managed reboot mode, primary VM 420 may allow for launching of secondary VM 420 without interfering with the network service provided by the network OS of primary VM 420, as described below.

As further shown in FIG. 5, process 500 may include causing a secondary VM to be launched based on receiving the indication to perform the managed reboot (block 510). For example, primary VM 420 may cause secondary VM 420 (e.g., VM 420-2) to be launched based on receiving the indication to perform the managed reboot. In some implementations, primary VM 420 may cause secondary VM 420 to be launched after primary VM 420 receives the indication to perform the managed reboot. Additionally, or alternatively, primary VM 420 may cause secondary VM 420 to be launched after primary VM 420 enables the managed reboot mode on network device 210.

In some implementations, network device 210 may cause secondary VM 420 to be launched in order to initiate another instance of the network OS (in addition to the instance of the network OS hosted by primary VM 420) on network device 210. In some implementations, primary VM 420 may cause secondary VM 420 to be launched by providing, to host OS 410, and indication to launch secondary VM 420. Here, host OS 410 may receive the indication, and may launch secondary VM 420 based on information, associated with launching VM 420, that is stored or accessible by host OS 410. In some implementations, launching secondary VM 420 may include starting secondary PF 430 on secondary VM 420. As described below, after secondary VM 420 is configured to forward traffic, associated with the network service, secondary VM 420 may provide the network service using the instance of the network OS associated with secondary VM 420 (e.g., rather than the instance of the network OS associated with primary VM 420).

In some implementations, network device 210 may launch identical VMs 420 such that network device 210 hosts different instances of the network OS. Here, successively launched VMs 420 are similarly configured upon being launched (i.e., the network OS may boot-up in the same manner on each launched VM 420). In some implementations, launching secondary VM 420 while primary VM 420 is still running allows for a reduced amount of time during which the network service is unavailable (e.g., as compared to shutting down and restarting a VM 420 in order to reboot the network OS or launching secondary VM 420 after completely shutting down primary VM 420).

In some implementations, during launch, secondary VM 420 may determine (e.g., based on reading the value of the reboot mode variable stored in the kernel) that the managed reboot mode is enabled on network device 210, and may alter an operation of secondary VM 420. For example, secondary VM 420 may determine that the managed reboot mode is enabled on network device 210, and may prevent secondary VM 420 and/or one or more elements of secondary VM 420 (e.g., secondary PF 430, a daemon associated with secondary VM 420) from accessing a hardware component (e.g., an ASIC) of network device 210. As another example, secondary VM 420 may determine that the managed reboot mode is enabled on network device 210, and may cause secondary PF 430 to delay initialization or reset of a hardware component of network device 210. In some implementations, secondary VM 420 may prevent hardware access and/or delay initialization or reset of hardware in order to prevent secondary VM 420 from interfering with provisioning of the network service by primary VM 420, thereby reducing an amount of time during which the network service is unavailable (e.g., since primary VM 420 may continue providing the network service while secondary VM 420 launches).

As further shown in FIG. 5, process 500 may include determining that the launch of the secondary VM is complete (block 515). For example, primary VM 420 may determine that the launch of secondary VM 420 is complete.

In some implementations, primary VM 420 may determine that the launch of secondary VM 420 is complete based on information provided by secondary VM 420. For example, secondary VM 420 may be configured to provide, to host OS 410 and/or primary VM 420, a notification that the launch of secondary VM 420 is complete (e.g., after secondary VM 420 is running and after elements of secondary VM 420 are started, such as secondary PF 430). Additionally, or alternatively, primary VM 420 may periodically request (e.g., from secondary VM 420 and/or host OS 410) a status of the launch of secondary VM 420, and may determine that the launch of secondary VM 420 is complete based on a response provided by host OS 410 and/or secondary PF 430.

As further shown in FIG. 5, process 500 may include shutting down the primary VM based on determining that the launch of the secondary VM is complete (block 520). For example, primary VM 420 may shut down primary VM 420 based on determining that the launch of secondary VM 420 is complete.

In some implementations, shutting down primary VM 420 may cause primary PF 430 to be terminated, and may stop primary VM 420 and/or primary PF 430 from accessing a hardware component of network device 210. However, in some implementations, primary VM 420 may determine that the managed reboot mode is enabled on network device 210, and may alter performance of the shutdown. For example, primary VM 420 may determine (e.g., based on reading the value of the reboot mode variable stored in the kernel) that network device 210 is in the managed reboot mode, and may not perform an operation associated with closing network ports for forwarding data plane traffic.

In some implementations, shutting down primary VM 420 causes control plane traffic, associated with the network service, to stop being forwarded. For example, primary PF 430 may be responsible for forwarding control plane traffic. As such, when network device 210 shuts down primary VM 420 on which primary PF 430 is running, primary PF 430 stops forwarding the control plane traffic.

However, data plane traffic may still be forwarded by network device 210 despite primary VM 420 being shut down. Here, hardware components of network device 210 may not be affected by the shutdown and the network ports may remain open. Thus, network device 210 may continue forwarding data plane traffic in accordance with configurations programmed on the hardware components at the time that primary VM 420 is shut down. In other words, the data plane traffic may continue to be forwarded based on current programming of the hardware components of network device 210, but access to the hardware components to alter the programming is cut-off (e.g., since no control plane traffic is forwarded after the shutdown, since primary PF 430 cannot program the hardware components after being shut down, etc.). In some implementations, a time at which primary VM 420 shuts down and primary PF 430 is terminated may be referred to as a control plane traffic stop time.

In some implementations, primary VM 420 may disable the managed reboot mode on network device 210 during shutdown of primary VM 420. For example, primary VM 420 may disable the managed reboot mode on network device 210 by setting the reboot mode variable, stored in the kernel associated with the host OS, to a value indicating that the managed reboot mode is disabled. In some implementations, secondary VM 420 may be configured for forwarding of traffic based on the managed reboot mode being disabled, as described below.

As further shown in FIG. 5, process 500 may include configuring the secondary VM for forwarding of control plane traffic associated with the network service (block 525). For example, secondary VM 420 may be configured for forwarding of control plane traffic associated with the network service. In some implementations, secondary VM 420 may be configured for forwarding of the control plane traffic after primary VM 420 shuts down. Additionally, or alternatively, secondary VM 420 may be configured for forwarding of control plane traffic after primary VM 420 disables the managed reboot mode on network device 210.

In some implementations, secondary VM 420 may be configured for forwarding of the control plane traffic based on determining that the managed reboot mode has been disabled on network device 210. For example, secondary VM 420 may be configured such that, after launch, secondary VM 420 periodically reads the reboot mode variable stored in the kernel. Here, after primary VM 420 disables the managed reboot mode (as described above) secondary VM 420 may read the reboot mode variable, determine that the managed reboot mode has been disabled on network device 210, and may be configured for forwarding of the control plane traffic based on determining that the managed reboot mode has been disabled.

In some implementations, secondary VM 420 may be configured for forwarding of the control plane traffic by performing one or more operations associated with configuring elements of secondary VM 420 to provide the network service associated with the network OS. For example, secondary VM 420 may perform an optics scan (e.g., in order to detect a quad small form-factor pluggable and/or a small form-factor pluggable transceiver), start a state machine (e.g., a state machine associated with a photonic integrated circuit (PIC) and/or a flexible PIC concentrator), send a port map to permit creation of one or more interfaces in the kernel, establish one or more chassis connections, or the like. In other words, secondary VM 420 may configure one or more (software) elements of secondary VM 420 for forwarding of the control plane traffic.

In some implementations, secondary VM 420 may complete the operations, associated with being configured for forwarding of the control plane traffic, before secondary VM 420 starts an operation associated with being configured for forwarding of data plane traffic. For example, secondary VM 420 may be configured to complete the optics scan, start the state machine, send the port map, and establish the one or more chassis connections, before secondary VM 420 starts performing an operation associated with being configured for forwarding of data plane traffic in the manner described below.

In some implementations, secondary VM 420 may not start the operation, associated with being configured for forwarding of the data plane traffic, in order to reduce an amount of time that the data plane is unavailable for forwarding of data plane traffic. For example, as described above, network device 210 may continue forwarding data plane traffic even after primary VM 420 is shut down. However, as described below, network device 210 may stop forwarding data plane traffic when secondary VM 420 starts the operation associated with being configured for forwarding of the data plane traffic. As such, secondary VM 420 may wait to perform data plane related operations in order to allow network device 210 to continue forwarding data plane traffic while secondary VM 420 is configured for forwarding the control plane traffic.

As further shown in FIG. 5, process 500 may include configuring the secondary VM for forwarding of data plane traffic associated with the network service (block 530) and beginning to provide the network service using the secondary VM (block 535). For example, secondary VM 420 may configure secondary VM 420 for forwarding of data plane traffic associated with the network service, and begin providing the network service using secondary VM 420. In some implementations, secondary VM 420 may be configured for forwarding of data plane traffic after secondary VM 420 is configured for forwarding of control plane traffic, as described above.

In some implementations, secondary VM 420 may be configured for forwarding of the data plane traffic by performing one or more operations associated with configuring elements of secondary VM 420 and/or hardware components of network device 210 to provide the network service associated with the network OS. For example, secondary PF 430 may perform an operation associated with reinitializing a hardware component (e.g., an ASIC) of network device 210 associated with providing the network service. In some implementations, when secondary PF 430 begins the hardware reinitialization, network device 210 may stop forwarding data plane traffic. In some implementations, a time at which network device 210 stops forwarding the data plane traffic may be referred to as a data plane traffic stop time. As such, when secondary PF 430 begins initialization of the hardware, network device 210 may not be capable of forwarding data plane traffic or control plane traffic associated with the network service.

After initialization of the hardware is complete (e.g., after the hardware component is reprogrammed), network device 210 (e.g., secondary VM 420) may be ready to forward the data plane traffic and the control plane traffic. As such, secondary VM 420 may begin providing the network service after initialization of the hardware component is complete. In some implementations, a time at which network device 210 is ready to forward the data plane traffic and the control plane traffic (e.g., after hardware initialization) may be referred to as a network service restart time.

In this way, network device 210 may perform the managed reboot associated with the network service. In some implementations, an amount of time between the control plane traffic stop time and the data plane traffic stop time may be less than or equal to approximately 90 seconds. Additionally, or alternatively, an amount of time between the data plane traffic stop time and the network service restart time may be less than or equal to approximately 25 seconds. Additionally, or alternatively, an amount of time between the control plane traffic stop time and the network service restart time may be less than or equal to approximately 115 seconds.

In some implementations, host OS 410 may store information indicating that secondary VM 420 is active (e.g., rather than primary VM 420) based on secondary VM 420 providing the network service. In some implementations, host OS 410 may store the information indicating that secondary VM 420 is active in order to allow host OS 410 to monitor secondary VM 420 and/or restart secondary VM 420 (e.g., rather than primary VM 420) when, for example, network device 210 powers-on (e.g., after being powered off). In other words, after secondary VM 420 begins providing the network service, secondary VM 420 may be marked as active in order to indicate that secondary VM 420 is acting in a primary capacity (e.g., since the existing or current primary VM 420 may not be operating on host OS 410 after completion of process 500, secondary VM 420 may become primary VM 420).

In some implementations, process 500 may be repeated (e.g., based on receiving another indication to perform a managed reboot at a later time). For example, as described above, secondary VM 420 may assume the role of primary VM 420 after process 500 is completed. In this example, network device 210 may receive another indication to perform a managed reboot, and process 500 may be repeated (e.g., by launching a new secondary VM 420).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Implementations described herein may provide a managed reboot, associated with a network OS running as a VM, that increases availability of a network service provided by the network OS (e.g., as compared to a traditional reboot). In other words, the managed reboot may reduce an amount of time during which the network service is unavailable due to the reboot of the network OS.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a device, an indication to perform a managed reboot associated with a network service being provided using a first virtual machine (VM) running on the device;
launching, by the device and based on the receiving of the indication, a second VM on the device,
the second VM, at the launching of the second VM, being prevented from accessing or initializing hardware on the device;
shutting down, by the device and based on the launching of the second VM, the first VM,
forwarding of control plane traffic being stopped when after the shutting down of the first VM, and
data plane traffic being able to be forwarded after the shutting down of the first VM based on a managed reboot mode being enabled and based on network ports associated with the first VM remaining open;
disabling, by the device, the managed reboot mode;
configuring, by the device, the second VM for the forwarding of the control plane traffic based on the shutting down of the first VM and based on the disabling of the managed reboot mode;
configuring, by the device and after the configuring of the second VM for the forwarding of the control plane traffic, the second VM for the forwarding of the data plane traffic; and
providing, by the device and based on the configuring of the second VM for the forwarding of the data plane traffic, the network service using the second VM.

2. The method of claim 1, further comprising:
detecting a failure associated with the network service,
where the receiving of the indication to perform the managed reboot is based on detecting the failure associated with the network service.

3. The method of claim 1, further comprising:
determining that the managed reboot mode is enabled on the device; and
preventing, based on determining that the managed reboot mode is enabled, the first VM from performing an operation associated with stopping the forwarding of the data plane traffic during the shutting down of the first VM.

4. The method of claim 1, further comprising:
determining that the launching of the second VM is complete,
where the shutting down of the first VM is based on the determining that the launching of the second VM is complete.

5. The method of claim 1, further comprising:
receiving user input indicating that the managed reboot is to be performed,
where the receiving of the indication is based on the user input.

6. The method of claim 1, further comprising:
determining that the managed reboot mode is enabled on the device; and
delaying, based on the determining that the managed reboot mode is enabled, the second VM from resetting hardware of the device during the launching of the second VM.

7. The method of claim 1, further comprising:
receiving a notification that the launching of the second VM is complete,
where the shutting down of the first VM is based on receiving the notification.

8. A system, comprising:
a network device comprising:
a memory storing instructions; and
a processor to execute the instructions to:
receive an indication to perform a managed reboot associated with a network service,
the network service being provided by a first virtual machine (VM) running on the network device;
launch, based on the receiving of the indication, a second VM on the network device,
the second VM, at the launching of the second VM, being prevented from accessing or initializing hardware on the network device;
shut down the first VM after the launching of the second VM,
the shutting down of the first VM:
causing control plane traffic, associated with the network service, to stop being forwarded by the network device, and
enabling data plane traffic to be forwarded based on a managed reboot mode being enabled and based on network ports associated with the first VM remaining open;
disable the managed reboot mode;
configure the second VM for the forwarding of the control plane traffic based on the shutting down of the first VM and based on the disabling of the managed reboot mode;
initiate, after the configuring of the second VM for the forwarding of the control plane traffic, configuration of the second VM for forwarding the data plane traffic,
the initiating of the configuration of the second VM for the forwarding of the data plane traffic causing the data plane traffic to stop being forwarded by the network device; and
provide, after the configuration of the second VM for the forwarding of the data plane traffic is complete, the network service using the second VM,
providing the network service using the second VM causing the forwarding of the control plane traffic and the forwarding of the data plane traffic to resume.

9. The system of claim 8, where the processor is further to:
determine that the managed reboot mode is enabled on the network device; and
prevent, based on the determining that the managed reboot mode is enabled, the first VM from stopping the forwarding of the data plane traffic during the shut down of the first VM.

10. The system of claim 8,
where the processor is further to:
determine that the launching of the second VM is complete; and
where the shut down of the first VM is based on determining that the launch of the second VM is complete.

11. The system of claim 8, where an amount of time between a time that the forwarding of the data plane traffic is stopped and a time that the forwarding of the data plane traffic is resumed is less than or equal to 25 seconds.

12. The system of claim 8, where an amount of time between a time that the forwarding of the control plane traffic is stopped and a time that the forwarding of the data plane traffic is stopped is less than or equal to 90 seconds.

13. The system of claim 8, where an amount of time between a time that the forwarding of the control plane traffic is stopped and a time that the forwarding of the control plane traffic is resumed is less than or equal to 115 seconds.

14. The system of claim 8, where the processor is further to:
   determine that the managed reboot mode is enabled on the network device; and
   prevent, based on the determining that the managed reboot mode is enabled, the second VM from interfering with provisioning of the network service.

15. The system of claim 8, where the processor is further to:
   prevent the first VM from accessing the hardware on the network device based on the shutting down of the first VM.

16. A non-transitory computer-readable medium storing instructions, the instructions comprising:
   one or more instructions that, when executed by a network device, cause the network device to:
      receive an indication to perform a managed reboot associated with a network service being provided using a first virtual machine (VM) running on the network device;
      launch, based on the receiving of the indication, a second VM on the network device,
         the second VM, at launch, being prevented from accessing or initializing hardware on the network device;
      shut down, based on the launching of the second VM, the first VM,
         forwarding of first traffic being stopped after the shut down of the first VM, and
         second traffic being able to be forwarded after the shut down of the first VM based on a managed reboot mode being enabled and based on network ports associated with the first VM remaining open;
      configure the second VM for the forwarding of the first traffic based on the shut down of the first VM and based on the disabling of the managed reboot mode;
      configure, after the configuring of the second VM for the forwarding of the first traffic, the second VM for the forwarding of the second traffic; and
      provide, based on configuring the second VM for the forwarding of the second traffic, the network service using the second VM.

17. The non-transitory computer-readable medium of claim 16,
   where the one or more instructions, when executed by the network device, further cause the network device to:
      detect a failure associated with the network device; and
   where the receiving of the indication to perform the managed reboot is based on the detecting of the failure associated with the network device.

18. The non-transitory computer-readable medium of claim 16,
   where the one or more instructions, when executed by the network device, further cause the network device to:
      determine that the launch of the second VM is complete; and
   where the shut down of the first VM is based on the determining that the launch of the second VM is complete.

19. The non-transitory computer-readable medium of claim 16, where the one or more instructions, when executed by the network device, further cause the network device to:
   periodically request a status of the launching of the second VM, and
   determine that the launching of the second VM is complete based on a response to the request.

20. The non-transitory computer-readable medium of claim 16, where an operation associated with closing the network ports is not performed based on the network device being in the managed reboot mode.

* * * * *